March 4, 1969  L. D. BUTLER  3,430,783
BALE WAGON
Filed June 21, 1967  Sheet 1 of 2
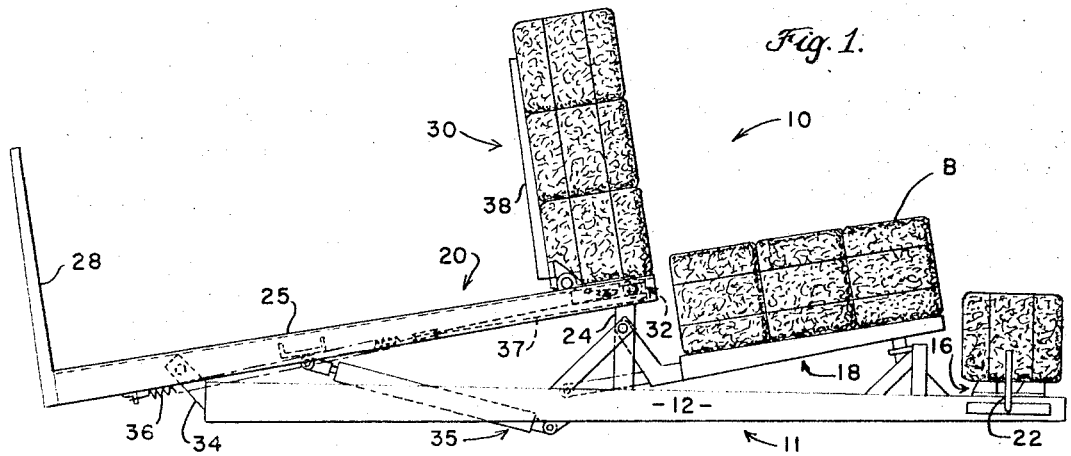
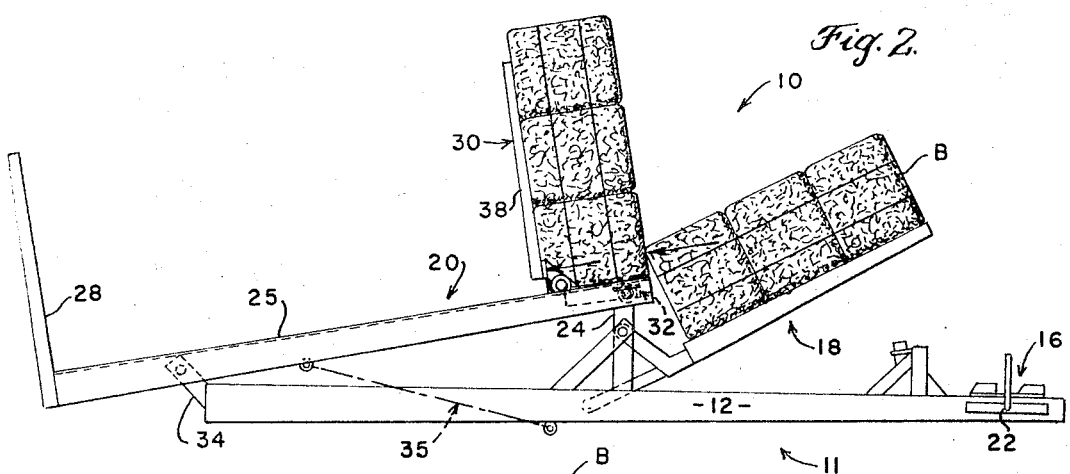
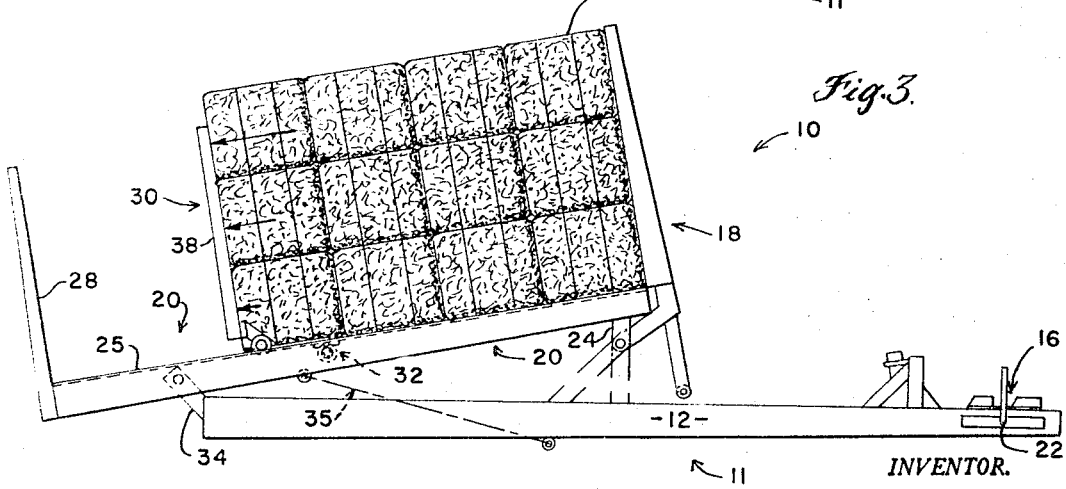
INVENTOR.
LEE D. BUTLER
BY
Donald D. Schaper
ATTORNEY March 4, 1969  L. D. BUTLER  3,430,783
BALE WAGON
Filed June 21, 1967  Sheet 2 of 2
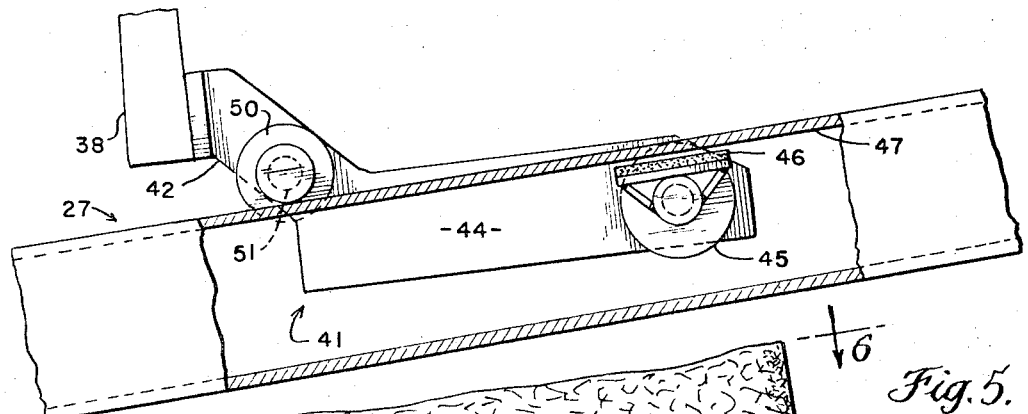
Fig. 4.
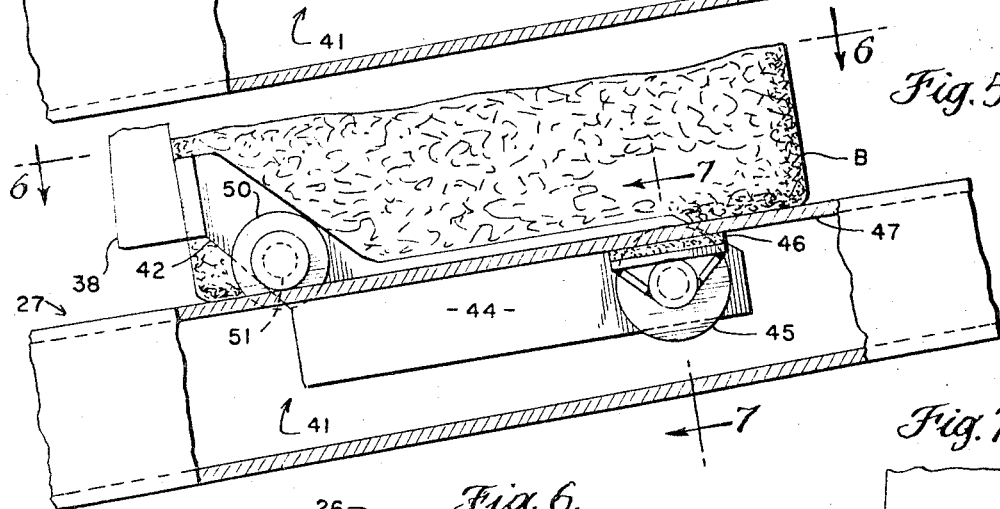
Fig. 5.
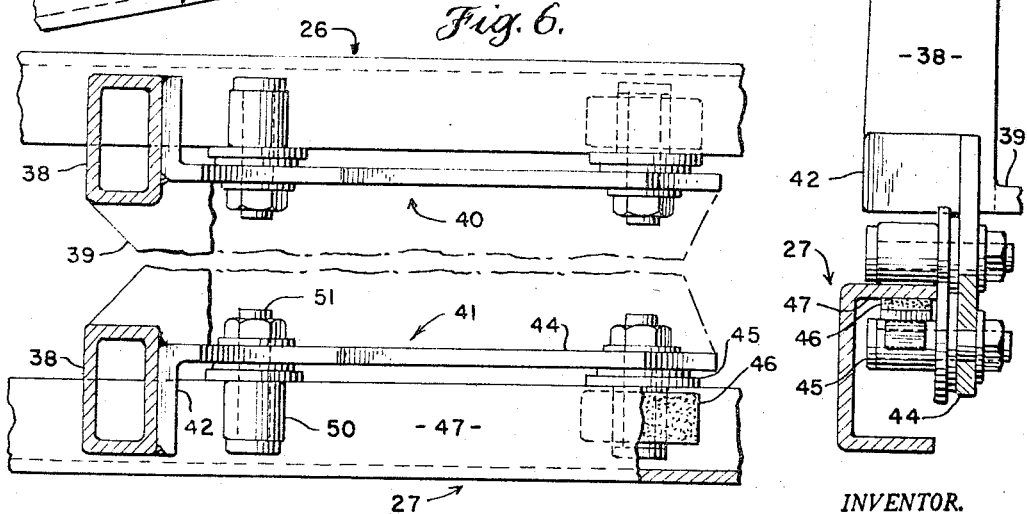
Fig. 6.
Fig. 7.
INVENTOR.
LEE D. BUTLER
BY
Donald D. Schaper
ATTORNEY United States Patent Office 3,430,783
Patented Mar. 4, 1969

3,430,783
BALE WAGON
Lee Dennis Butler, Kingsburg, Calif., assignor to Sperry Rand Corporation, New Holland, Pa., a corporation of Delaware
Filed June 21, 1967, Ser. No. 647,812
U.S. Cl. 214—6                 4 Claims
Int. Cl. B65g 57/28

ABSTRACT OF THE DISCLOSURE

A bale wagon having a load-retaining rack which is movable to a plurality of positions on the load-carrying bed and is held in position by a braking device which automatically permits movement of the rack and the load supported thereby when additional bales are loaded on the load-carrying bed.

Background of the invention

This invention relates to bale wagons, and more specifically, to a device for vertically supporting bales on the wagon as the wagon is being filled.

In one known type of bale wagon, tiers of bales, four bales high and two bales across, are successively loaded onto the forward end of the load-carrying bed. As each tier is loaded, the bales on the wagon are moved rearwardly one bale width to provide space for the new tier. A movable tine rack on the load-carrying bed supports the rear end of the load as it is being accumulated on the bale wagon.

Heretofore, the movable tine rack has been spring biased against load; and as a tier of bales was loaded onto the load-carrying bed, the rack would move rearwardly against the spring action to accommodate the new tier of bales. Under some operating conditions, particularly when the load-carrying bed is substantially filled, the load has a tendency to shift rearwardly against the spring action. If the load shifts more than one bale width before the next tier is loaded, an undesirable spacing results between the new tier and the rest of the load.

Summary of the invention

Applicant's invention is directed to a braking device for holding a movable tine rack in a fixed position relative to the load-carrying bed, except when a new tier of bales is being loaded on the bed.

The movable tine rack comprises a plurality of vertically extending tines which are fixed at their lower ends to a transversely extending cross bar. The rack is supported for movement relative to the load-carrying bed on a pair of rollers which run on the load-carrying bed frame elements. Each of the rollers is carried on a pivot bracket fixed to the bottom portion of the tine rack. Each pivot bracket carries a friction pad which is adapted to contact a bed frame element when it is desired to hold the rack in a fixed position.

When a tier of bales is loaded onto the load-carrying bed, the oncoming tier first contacts the bottom bales of the forward tier of bales on the load-carrying bed, and it applies a rearward force on the loaded bales at a location just above the load-carrying bed floor. When a force is applied in this vertical location, rearward movement of the load and the movable tine rack results because the frictional force exerted by the friction pads on the bed frame is overcome. Movement of the tine rack comes to a stop, however, when the oncoming tier reaches a position substantially perpendicular to the load-carrying bed because the force resulting from the bales pushing against the rack is now substantially uniform along the vertical extent of the rack. This force is transferred through the rack and is directed in a direction substantially perpendicular to the friction pad surface to cause the friction pad to be pressed against the chassis frame member and thereby lock the movable rack in position until the next tier of bales is loaded.

A principal object of this invention is to provide a movable rack, in a bale wagon of the type described, which retains loaded bales in place on the load-carrying bed and is automatically moved to a new position when a new tier of bales is loaded.

Another object of this invention is to provide a movable rack in a bale wagon in which movement of the rack is controlled by the location of forces directed against the rack.

A further object of this invention is to provide a rack brake device which is adapted to increase the braking force in proportion to the load on the movable rack.

A still further object of this invention is to provide an efficient, simple, inexpensive means for positively holding a movable vertical support means in an adjusted position.

Other objects of this invention will be apparent hereinafter from the specification and from the recital in the appended claims.

Brief description of the drawings

FIG. 1 is a side elevational view of a bale wagon and showing a loaded transfer bed ready to be raised to place the load on the load-carrying bed.

FIG. 2 shows the transfer bed in a partially raised position, with the bales thereon contacting the bottom bales in the front tier on the load-carrying bed.

FIG. 3 shows the transfer bed in a fully raised position.

FIG. 4 is an enlarged view of one of the pivot brackets and showing the friction pad out of contact with the bed frame member, this being the position of the friction pad and pivot bracket when the load-carrying bed is empty.

FIG. 5 is a view similar to FIG. 4, but showing the friction pad in contact with the bed frame member as a result of the rearward bale force on the tine rack.

FIG. 6 is a broken out plan view, taken on the lines 6—6 of FIG. 5.

FIG. 7 is a cross section, taken on the line 7—7 of FIG. 5.

Description of the preferred embodiment

Referring now to the drawings by numerals of reference and particularly to FIG. 1, the bale wagon selected to illustrate the invention is designated 10. Bale wagon 10 includes a chassis 11 comprised of a pair of longitudinal frame members, one of which is shown at 12. Chassis 11 is supported adjacent its rear end by a pair of wheels, not shown. A receiving bed 16 is mounted on the forward end of chassis 11, a transfer bed 18 is mounted rearwardly of the receiving bed, and a load-carrying bed 20 extends from the transfer bed to the rear end of chassis 11. The forward end of chassis 11 is adapted to be connected to a towing vehicle, not shown. Bales B of hay, or other crop material, are loaded and stacked on wagon 10 in substantially the same manner as shown and described in the U.S. patent to Grey No. 2,848,128, issued Aug. 19, 1958.

Receiving bed 16 is pivotally mounted on chassis 11 and is adapted to deposit bales on transfer bed 18. A trip mechanism 22 is provided to actuate hydraulic lift means, not shown, when two bales have been received and positioned on the bed.

Transfer bed 18 is pivotally mounted to upstanding brackets 24 carried on chassis 11. The transfer bed is movable from a generally horizontal load-accumulating position, shown in FIG. 1, to a generally vertical load-dispensing position, shown in FIG. 3. A hydraulic actuator, not shown, is employed to raise the transfer bed when it has been loaded. For purposes of illustration, the bed is shown as having a capacity of 6 bales; however, it will be apparent that the capacity of the transfer bed could be changed without affecting the functioning of the wagon. A tripping mechanism, not shown, starts the transfer bed on its upward movement when the bed has been loaded.

Load-carrying bed 20, as shown in FIGS. 1–3, comprises a floor 24, a pair of frame elements 26 and 27, fixed tines 28 at the extreme rear end of floor 25, a movable rack 30, and a brake mechanism 32 for holding movable rack 30 in a fixed position. Load-carrying bed 20 is pivotally mounted to brackets 34 on chassis 11, and the bed can be raised by a hydraulic actuator 35 when it is desired to unload the bales. A spring means 36 is provided which biases rack 30 in a forward direction and serves to return rack 30 to the forward end of the wagon when the bales are unloaded. Spring means 36 is connected to the rear end of bed 20; and a cable 37, connected to spring means 36, extends forwardly to a sheave, not shown, at the forward end of bed 20, and then rearwardly to rack 30.

Movable rack 30 serves as support means for the rear end of the load on bed 20. Rack 30 comprises vertically extending tines 38, and a transversely extending cross bar 39.

Brake mechanism 32 serves as a holding means for rack 30 and comprises a pair of pivot brackets 40 and 41 joined to rack 30 adjacent the bottom edge of the rack. The pivot brackets 40 and 41 are substantially identical, the only difference being in the shape of some components to provide for right and left hand mounting, as shown in FIG. 6. Thus, only bracket 41 will be described, it being understood that pivot bracket 40 is constructed and functions in the same manner. Bracket 41 consists of one leg 42 which extends upwardly and is joined to the vertically extending tine 38 by welding, or by other means. A second leg 44 extends forwardly generally parallel to bed frame element 27. A shoe 45 is fixed to the forward end of bracket leg 44 and carries a friction pad 46 which is adapted to contact a side wall 47 of bed frame element 27. A roller 50 is mounted on a fastener 51 which is fixed to pivot bracket 41 adjacent a bottom portion of leg 42.

Movable tine rack 30 is pivotal about the horizontal axis of rollers 50. The distance between roller 50 and friction 46 has been calculated so that when three bales exert a rearward force on rack 30, as shown in FIG. 3, the frictional force between pad 46 and wall 47 will be great enough to prevent rearward movement of the rack. However, when an additional force is applied adjacent bed floor 25, as shown in FIG. 2, the frictional force will be overcome and the rack will move rearwardly until the forces are again substantially equal along the vertical extent of the rack. Cable 37 is connected to movable rack 30 above roller 50 so that there is enough spring action biasing pad 46 away from wall 47 to allow the rack to return to the forward end of the bed after the bales have been unloaded.

In operation, bales B are loaded onto the receiving bed 16, one bale at a time. When two bales have been received and positioned on the receiving bed, tripping mechanism 22 causes the bed to be pivoted upwardly to deposit the two bales on transfer bed 18. When a layer of six bales has been accumulated on transfer bed 18, the transfer bed is raised to a vertical position, as shown in FIG. 3, and the layer of bales is placed on bed 20 in the form of a vertical tier. Each time a tier of bales is placed on the load-carrying bed, movable rack 30 must be indexed rearwardly one bale width.

As shown in FIG. 2, when transfer bed 18 starts upwardly the rear-most bale on the bed contacts the bottom bales of the front tier on the bed 20. This applies a force as shown by the arrows in FIG. 2. Because of the location of this force, the frictional force of braking device 32 will be overcome and the rack will be moved rearwardly. As the transfer bed advances upwardly from the position shown in FIG. 2, forces are applied progressively higher on the front tier of bales. When the transfer bed is in its fully up position, as shown in FIG. 3, the forces on rack 30 will be as shown by the arrows in FIG. 3. With the forces distributed along the vertical extent of the rack, the frictional force on braking device 32 will again be great enough to hold the rack in position.

It will be apparent from the foregoing description that an inexpensive and simple means has been disclosed for maintaining a movable tine rack in a desired position on the load-carrying bed. The invention utilizes the pivotal movements of the transfer bed and the bales carried on the load-carrying bed to effect the braking action; thus, the brake device is very simple and requires only a few parts in addition to the conventional tine rack structure. A further advantage which results from using the loaded bales to effect the braking action is that the braking force increases in proportion to the load carried on the load-carrying bed.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A bale wagon comprising:
   a chassis structure;
   bed means on said chassis structure, said bed means being adapted to receive successive tiers of bales at one end thereof;
   support means mounted on said wagon for retaining bales in tier form and adapted to move away from said one end as additional tiers are placed thereon;
   holding means operatively connected to said support means for securing said support means in a series of positions along said bed means, said holding means preventing movement of said support means when a plurality of substantially equal forces are applied to said support means along the vertical extent thereof, and said holding means permitting movement of said support means when an additional force is applied to said support means adjacent said bed means, said holding means comprising a pair of pivot brackets, each of said pivot brackets having one leg which extends vertically in the direction of said support means and another leg which extends longitudinally in the direction of said bed means, and each of said brackets being pivotally connected to a roller mounted for movement along said bed means.

2. A bale wagon, as recited in claim 1, wherein each of said longitudinally extending legs carries a friction pad which is adapted to contact the frame element in said bed means.

3. A farm inplement comprising:
   a first load-supporting means;
   a second load-supporting means extending generally perpendicular to said first load-supporting means and movable adjacent thereto; and
   a holding mechanism for securing said second load-supporting means in an adjusted position relative to said first load-supporting means, said holding mechanism comprising a friction pad adapted to contact said first load-supporting means, the compressive force on said friction pad being determined by the magnitude and the location of the forces resulting from the load on said second load-supporting means, said holding mechanism comprising a pair of pivot brackets, said pivot brackets being supported on rollers, and said rollers being movable on said first load-supporting means.

3. A farm implement comprising:
each of said pivot brackets has a vertically extending leg connected to said second load-supporting means and a generally horizontally extending leg which extends adjacent said first load-supporting means.

References Cited

UNITED STATES PATENTS

| | | | |
|---|---|---|---|
| 2,848,127 | 8/1958 | Grey. | |
| 3,002,326 | 10/1961 | Carter et al. | 214—6 X |
| 3,059,789 | 10/1962 | Bowles | 214—41 |
| 3,220,586 | 11/1965 | Gollnick | 214—518 |
| 3,251,485 | 5/1966 | Fancher | 214—6 |
| 3,272,352 | 9/1966 | Adams et al. | 214—7 |

FOREIGN PATENTS 236,856  11/1964  Austria.

GERALD M. FORLENZA, *Primary Examiner.*

ROBERT J. SPAR, *Assistant Examiner.*

U.S. Cl. X.R.

214—7; 105—385

UNITED STATES PATENT OFFICE
CERTIFICATE OF CORRECTION

Patent No. 3,430,783

March 4, 1969

Lee Dennis Butler

It is certified that error appears in the above identified patent and that said Letters Patent are hereby corrected as shown below:

Column 5, line 3, "3. A farm implement comprising:" should read -- 4. A farm implement, as recited in claim 3, wherein --.

Signed and sealed this 29th day of December 1970.

(SEAL)
Attest:

Edward M. Fletcher, Jr.
Attesting Officer

WILLIAM E. SCHUYLER, JR.
Commissioner of Patents